United States Patent
Rosenhahn et al.

(10) Patent No.: US 7,294,192 B2
(45) Date of Patent: Nov. 13, 2007

(54) HEAT-STABLE ZINC FERRITE COLOUR PIGMENTS, PROCESS FOR PREPARING THEM AND THEIR USE

(75) Inventors: Carsten Rosenhahn, Krefeld (DE); Horst Brunn, Meerbusch (DE); Wolfgang Oehlert, Krefeld (DE)

(73) Assignee: LANXESS Deutschland GmbH, Leverkusen (DE)

(*) Notice: Subject to any disclaimer, the term of this patent is extended or adjusted under 35 U.S.C. 154(b) by 165 days.

(21) Appl. No.: 10/970,249

(22) Filed: Oct. 21, 2004

(65) Prior Publication Data
US 2005/0087106 A1    Apr. 28, 2005

(30) Foreign Application Priority Data
Oct. 24, 2003    (DE)    ................ 103 49 810

(51) Int. Cl.
*C09C 1/22*    (2006.01)
(52) U.S. Cl. ...................... 106/459; 106/419
(58) Field of Classification Search ............... 106/459; 252/471; 417/420
See application file for complete search history.

(56) References Cited

U.S. PATENT DOCUMENTS

| | | | | |
|---|---|---|---|---|
| 2,904,395 | A | * | 9/1959 | Downs et al. ............ 423/594.1 |
| 3,270,080 | A | * | 8/1966 | Christmann .................. 585/622 |
| 3,832,455 | A | | 8/1974 | Smith et alm .............. 423/594 |
| 3,998,760 | A | * | 12/1976 | Christmann et al. ........ 502/324 |
| 4,222,790 | A | | 9/1980 | Dickerson .................... 106/304 |
| 4,443,264 | A | | 4/1984 | Hund et al. .................... 31/292 |
| 4,681,637 | A | | 7/1987 | Rademachers et al. ..... 154/304 |
| 4,952,617 | A | | 8/1990 | Ayala et al. |
| 4,985,078 | A | * | 1/1991 | Rademachers et al. ..... 106/419 |
| 5,611,679 | A | * | 3/1997 | Ghosh et al. ................ 417/420 |
| 6,375,862 | B1 | * | 4/2002 | Umeda et al. ............. 252/62.6 |

FOREIGN PATENT DOCUMENTS

| | | |
|---|---|---|
| GB | 790949 | 2/1958 |
| JP | 57 011829 | 1/1982 |

OTHER PUBLICATIONS

Richard J. Lewis, Sr., 1993, Van Nostrand Reinhold Company, Twelfth Edition, p. 917.*
T.C. Patton in Pigment Handbook, vol. 1, Properties and Economics, pp. 347-348, John Wiley and Sons, New York 1973.
A. Kalendova, et al, "Anticorrosive Pigments for Chemically and Thermally Resistant Coatings", Macromol. Symp., Bd. 187, 2002, Seiten 97-107, XP001204358, Seite 102.

* cited by examiner

*Primary Examiner*—J. A. Lorengo
*Assistant Examiner*—Pegah Parvini
(74) *Attorney, Agent, or Firm*—Nicanor A. Kohncke; Norman B. Thot

(57) ABSTRACT

The present invention relates to zinc ferrite colour pigments, including a process for preparing and using them and, more particularly, the present invention relates to light-coloured zinc ferrite colour pigments having enhanced thermal stability, a magnesium content of from 0.01%-0.4% by weight, a color difference $\Delta E^*$ according to DIN 53 772 at 260° C. of <3.0, a color difference $\Delta E^*$ according to DIN 53 772 at 300° C. of <5.0, and a lightness of $L^*$, measured in PE-HD full shade according to DIN 55 772 of >52.5.

10 Claims, No Drawings

HEAT-STABLE ZINC FERRITE COLOUR PIGMENTS, PROCESS FOR PREPARING THEM AND THEIR USE

BACKGROUND OF THE INVENTION

1. Field of the Invention

The present invention relates to zinc ferrite colour pigments, to a process for preparing them and to their use. In particular, the present invention relates to light-coloured zinc ferrite colour pigments having enhanced thermal stability. As used herein and in the claims the word "color" and the British variant thereof, "colour", shall be used interchangeably and understood to have the same meaning.

2. Brief Description of the Prior Art

Depending on its stoichiometric composition, additives, particle sizes, crystal form and surface properties zinc ferrite, which crystallizes in the spinel lattice, can be used as a starting material for soft magnets, as a corrosion preventative or as a colour pigment. In this regard, the term "tan" pigments has been used for non-ferrimagnetic colour pigments.

U.S. Pat. No. 3,832,455 describes the preparation of zinc ferrite pigments wherein a precipitate of iron oxide hydroxide from iron(II) sulphate solution on zinc oxide or zinc carbonate at a pH of from 5 to 6 and a temperature of from 49 to 52° C. is filtered and the solids are washed, dried and calcined.

U.S. Pat. No. 2,904,395 describes the preparation of zinc ferrite pigments either by co-precipitation from the corresponding iron-containing and zinc-containing solutions with subsequent filtration, washing, drying and calcining or else by calcining of an intimate mixture of iron oxide hydroxide and zinc oxide obtained in aqueous suspension. Calcining takes place at temperatures up to 1000° C. with the addition of catalysts, hydrochloric acid or zinc chloride for example.

U.S. Pat. No. 4,222,790 describes how the calcining operation for preparing zinc ferrite or magnesium ferrite can be improved by adding alkali metal silicate to the mixture. As a flocculent for the filtration it is possible to add aluminium sulphate.

The addition of $Al_2O_3$— and $P_2O_5$— forming compounds during the calcination of chloride-free zinc ferrite pigments of high colour purity is described in DE-A 31 36 279.

Zinc ferrite pigments of high colour purity without additives can be obtained in accordance with EP-B 1 54 919 by using acicular α-FeOOH of defined particle size and surface area and zinc oxide of defined surface area.

To improve the cooling characteristics after calcining, boric acid or boron phosphates are employed.

In JP-B 5 70 11 829, titanium oxide is added for preparing heat-resistant yellow zinc ferrite pigments.

Finally, T.C. Patton in Pigment Handbook, Vol. 1, Properties and Economics, pp. 347 and 348, John Wiley & Sons, New York 1973 describes the anisometric zinc ferrites.

Since they are distinguished by outstanding light stability and weather stability and also by high thermal stability zinc ferrites are used instead of less heat-stable mixtures of yellow iron oxide and red iron oxide.

Also, they have found application in particular for the colouring of sand granules, lime sandstones, enamels, ceramic glazes, baking enamels and plastics.

Despite the fact that the zinc ferrite pigments are prepared at high temperatures, above 700° C., in a variety of systems they are subject to varying levels of colour change at relatively lower temperatures, particularly when used for colouring organic materials. In these systems, therefore, they can frequently no longer be regarded as thermally stable. In the colouring of plastics, for instance, it is found that above about 250° C. the shift in shade towards darker, dirty tones is already so marked that colouring with zinc ferrite pigments is no longer rational. This is particularly the case with the colouring of plastics which require relatively higher processing temperatures, such as polyamide or ABS plastics, for example.

DE-A 3 819 626 describes the preparation of thermally stable zinc ferrite colour pigments, a process for preparing them and their use. By adding a lithium compound to an initial mixture of zinc oxide and iron oxide, zinc ferrite colour pigments are prepared which contain lithium. When tested for heat resistance in PE-HD in accordance with DIN 53 772 these zinc ferrite colour pigments have a colour difference according to DIN 6174 of 2.8 $\Delta E^*$ units from reference samples produced at 260° C. and at the lowest possible test temperature (=200° C.). At processing temperatures of 300° C. the result was 5.0 $\Delta E^*$ units. In the colour locus, however, these pigments are darker in lightness by more than 2.5 $L^*$ units than undoped zinc ferrites.

It was an object of the invention to provide further zinc ferrite colour pigments which have a good and preferably better thermal stability than those of the prior art and are preferably light in colour.

SUMMARY OF THE INVENTION

This object has been achieved in the form of zinc ferrite colour pigments having a magnesium content of from 0.01 to 4% by weight. For an adequate thermal stability in the colouring of plastics at temperatures up to 300° C. or higher, even the surprisingly small amounts of magnesium in the zinc ferrite are effective to impart adequate thermal stability. For example, amounts of from 0.05 to 0.6% by weight of added magnesium are preferably sufficient. These pigments are therefore also suitable for incorporation into polyamide or ABS plastics. At magnesium contents higher than 4% by weight in the zinc ferrite there is a marked shift in pigment shade towards darker brown tones.

DETAILED DESCRIPTION OF THE INVENTION

As set forth above the present invention encompasses zinc ferrite colour pigments having small but effective magnesium content, typically in an amount of mangnesium content of from 0.01 to 4% by weight based on the weight in the zinc ferrite colour pigment.

The zinc ferrite colour pigments preferably have a colour difference $\Delta E^*$ according to DIN 53 772 at 260° C. of <3, more preferably <2.4.

The zinc ferrite colour pigments preferably have a colour difference $\Delta E^*$ according to DIN 53 772 at 300° C. of <5, more preferably <4.0.

The zinc ferrite colour pigments preferably have a lightness $L^*$, measured in PE-HD full shade according to DIN 53 772, of >52.5, more preferably >53.5.

The zinc ferrite colour pigments preferably have a particle size of 0.15×0.5 μm.

This process is characterized in that a solution or raw-materials mixture which comprises or gives rise to an initial mixture of zinc oxide and iron oxide corresponding to the composition of the zinc ferrite colour pigments is admixed prior to or during calcining with one or more magnesium compounds in amounts such that after calcining there is from 0.01 to 4% by weight of magnesium, preferably from 0.05 to 0.4% by weight of magnesium, in the zinc ferrite colour pigment.

Magnesium compounds used in the context of the preparation of the thermally stable zinc ferrite colour pigments of the invention are preferably magnesium carbonate, magnesium fluoride, magnesium chloride, magnesium oxide, magnesium hydroxide, magnesium sulphate, magnesium nitrate, magnesium phosphate, magnesium silicate, magnesium titanate, magnesium zirconate, magnesium ferrite, magnesium zincate, magnesium borate, magnesium aluminate, magnesium stannate, magnesium aluminium silicate, and further, commonly known magnesium salts or magnesium-salt-containing compounds.

For practical reasons it is preferred to use magnesium carbonate in the case of dry mixtures and magnesium compounds preferably of low solubility in the case of suspensions which are still to be filtered. It is also possible to use preferably natural magnesium-containing minerals such as magnesite or dolomite. Likewise possible with preference is the addition of organomagnesium compounds.

Testing for thermal stability takes place in accordance with DIN 53 772 of September 1981 by 1% pigmentation in thermoplastics, the parameter determined being the deviation in colour of the sample specimens when the temperature of incorporation is increased, in comparison to the lowest possible test temperature.

The measurement of the lightness L* in PE-HD full shade takes place in accordance with DIN 53 772 of September 1981.

The advantage of the process of the invention is also to be seen in the fact that, owing to the small but effective amount of magnesium compounds added, the calcining temperature can be lowered as compared with the prior art.

The present invention additionally provides for the use of the zinc ferrite colour pigment of the invention for colouring baking enamels or coil coating materials, plastics, sand granules, lime sandstones, enamels and ceramic glazes. For the person skilled in the art the general use of the zinc ferrite colour pigments of the invention is state of the art. In the colouring of plastics, for example, the zinc ferrite colour pigments of the invention are added in the melted state, mixed and processed.

The examples which follow illustrate the invention, with no intention that the invention should be restricted as a result.

EXAMPLES

Example 1

9200 l of a homogenized aqueous suspension containing 5521 kg of goethite (corresponding to 4859 kg of $Fe_2O_3$) and 2413 kg of zinc oxide (with 99.6% by weight of ZnO) are filtered, 21.8 kg of MgO in form of magnesium carbonate are added to the filter cake, which contains about 32% by weight of dry solids, the components are intimately mixed in an appropriate mixing unit and the mixture is calcined at 810° C. for about 30 minutes. On cooling, the clinker, which contains 0.3% by weight of magnesium, is ground. This gives a light-coloured, bright yellowish brown pigment.

When the pigment obtained was tested for heat resistance in PE-HD according to DIN 53 772 the results of a pigmentation of 1% by weight after processing in a twin-screw extruder and in the Arburg injection-moulding machine were colour differences according to DIN 6174 of 2.0 ΔE* units for the samples produced at 260° C. and at the lowest possible test temperature (=200° C.) as reference. At processing temperatures of 300° C. the results were 3.0 ΔE* units.

Example 1—Comparative

Without addition of magnesium units of 6.8 for 260° C. and 9.4 for 300° C. incorporation temperature were found. In comparison to pigments produced according to DE 381 926 the pigment produced in accordance with the invention is lighter in colour by more than one unit in testing to DIN 53 772.

Example 2

300 g of a goethite suspension (Fe content as $Fe_2O_3$: 5.1%) are admixed with 0.29 g of magnesium carbonate and 148 g of ZnO and then intimately mixed in an appropriate mixing unit and calcined at 850° C. for about 30 minutes. After cooling, the clinker is ground. This gives a light-coloured, bright yellowish brown pigment.

The colour differences found in PE-HD at 260° C. were 3.0 ΔE* units, relative to the plaques moulded at 200° C. In comparison to the pigments produced according to DE 381 926, the pigment produced in this way is lighter in colour by more than 1.5 units when tested according to DIN 53 772.

| | ΔE* at 260° C. | ΔE* at 300° C. | L* in full shade |
|---|---|---|---|
| Example 1 | 2.0 | 3.0 | 52.6 |
| Example 1—Comparative | 6.8 | 9.4 | 54.1 |
| Example 2 | 3.0 | <5 | 53.0 |
| Bayferrox ® 3950 from Bayer | 10.3 | 14.9 | 54.6 |
| TAN 10 A from Rockwood Pigments | 5.9 | 9.4 | 52.9 |
| Colortherm ® Yellow 30 according to DE 3 819 626 | 1.7 | 3.8 | 51.8 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. A zinc ferrite colour pigment having a magnesium content of from 0.3% to 4% by weight wherein the pigment has a lightness L*, measured in PE-HD full shade according to DIN 53 772 of >52.5.

2. The zinc ferrite colour pigment according to claim 1, wherein the magnesium content s from 0.3% to 0.6% by weight.

3. The zinc ferrite colour pigment according to claim 1, wherein the pigment has a colour difference ΔE* according to DIN 53 772 at 260° C. of <3.0.

4. The zinc ferrite colour pigment according to claim 1, wherein the pigment has a colour difference ΔE* according to DIN 53 772 at 260° C. of 2.4.

5. The zinc ferrite colour pigment according to claim 1, wherein the pigment has a colour difference ΔE* according to DIN 63 772 at 300° C. of <5.0.

6. The zinc ferrite colour pigment according to claim 1, wherein the pigment has a colour difference ΔE* according to DIN 53 772 at 300° C. of <4.0.

7. The zinc ferrite colour pigments according to claim 1, wherein the pigment has a lightness L*, measured in PE-HD full shade according to DIN 53 772 of >53.5.

8. A process for preparing the zinc ferrite colour pigment according to claim 1, comprising:
   admixing a starting solution or raw-materials mixture comprising goethite which gives rise to an initial mixture of zinc oxide and iron oxide corresponding to the composition of the zinc ferrite colour pigment; and
   calcining with one or more magnesium compounds in amounts effective to produce from 0.1 to 4% by weight of magnesium, after said calcining, in the zinc ferrite colour pigment.

9. The process according to claim 8, wherein after said calcining there is from 0.05 to 0.6% by weight of magnesium in the zinc ferrite colour pigment.

10. A process for colouring baking enamels, coil coating materials, plastics, sand granules, lime sandstones, enamels or ceramic glazes, comprising:
   adding the zinc ferrite colour pigment according to claim 1 to said baking enamels, coil coating materials, plastics, sand granules, lime sandstones, enamels or ceramic glazes.

* * * * *